United States Patent

[11] 3,585,460

| [72] | Inventors | William Herman Liederbach<br>Carmel, Ind.;<br>Bernard Schwartz, Poughkeepsie, N.Y. |
|---|---|---|
| [21] | Appl. No. | 875,447 |
| [22] | Filed | Nov. 10, 1969 |
| [45] | Patented | June 15, 1971 |
| [73] | Assignee | RCA Corporation |

[54] MINIATURE CERAMIC CAPACITOR AND METHOD OF MANUFACTURE
5 Claims, 9 Drawing Figs.

[52] U.S. Cl. .................................. 317/230,
317/238, 29/25.41
[51] Int. Cl. ..................................... H01g 3/06
[50] Field of Search ........................... 317/230,
231, 232, 233, 258

[56] References Cited
UNITED STATES PATENTS

| 3,325,699 | 6/1967 | Hellicar........................ | 317/230 |
| 3,330,999 | 7/1967 | Hellicar........................ | 317/230 |
| 3,419,759 | 12/1968 | Hayakawa.................... | 317/230 |
| 3,426,250 | 2/1969 | Kahn............................ | 317/230 |

*Primary Examiner*—James D. Kallam
*Attorney*—Glenn H. Bruestle

ABSTRACT: A capacitor comprising a porous, multicelled body composed of a high dielectric ceramic of the alkaline earth metal-titanate or zirconate type which has been reduced to the semiconducting state, a dielectric layer distributed throughout the cellular structure composed on an oxidized portion of the semiconducting body, one electrode composed of a conducting layer over at least a portion of the exterior surface of the dielectric layer, and another electrode in contact with the semiconducting body.

PATENTED JUN 15 1971        3,585,460
SHEET 1 OF 2
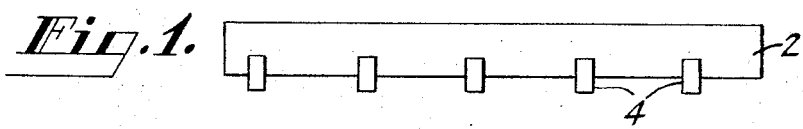
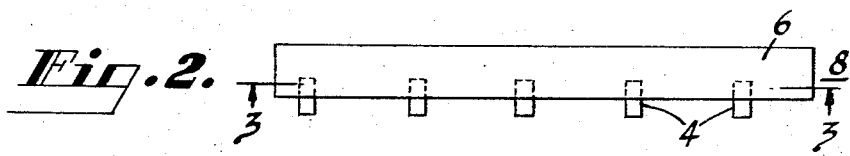
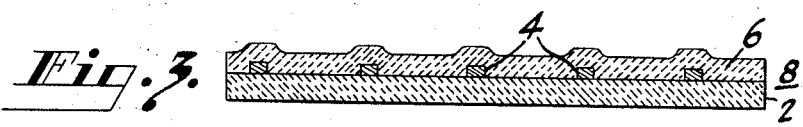
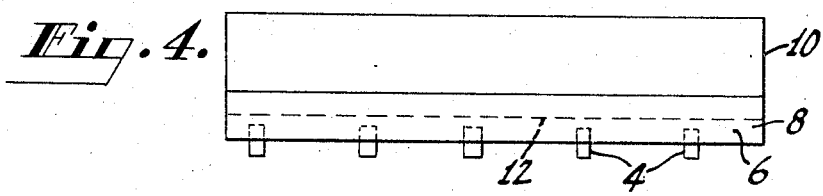
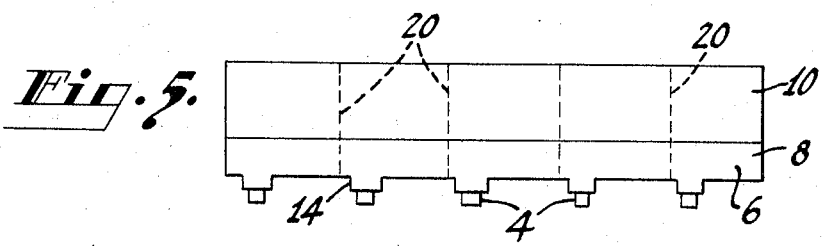
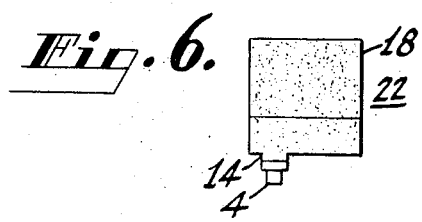 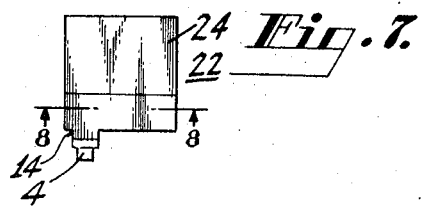
INVENTORS
WILLIAM H. LIEDERBACH &
BERNARD SCHWARTZ
BY
W. S. Hill
     Agent

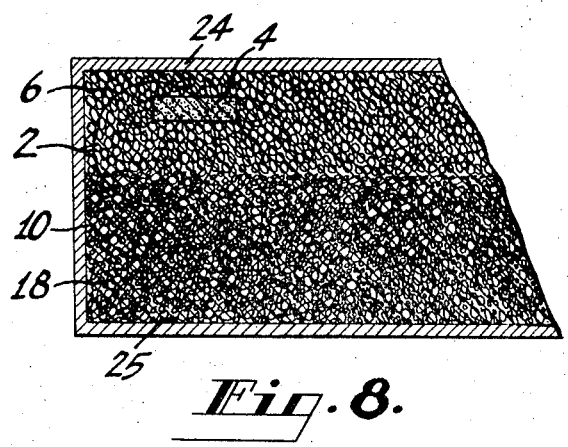
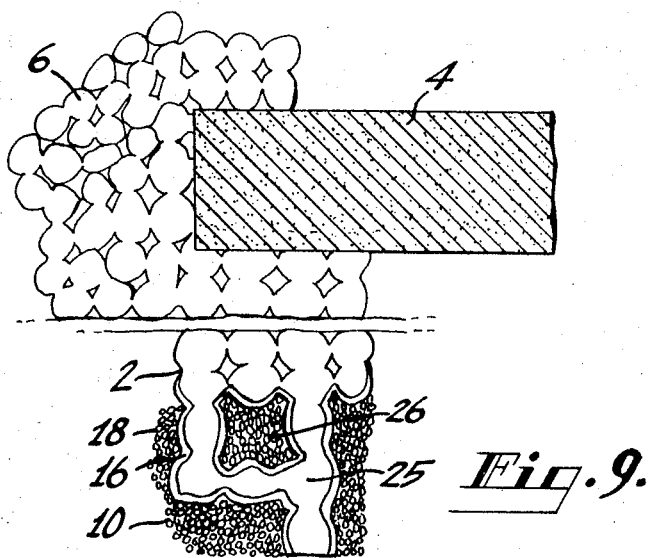

MINIATURE CERAMIC CAPACITOR AND METHOD OF MANUFACTURE

BACKGROUND OF THE INVENTION

The development of miniaturized circuits of the type wherein a number of circuit components are printed or mounted on a ceramic substrate which has a pattern of conductors screen-printed thereon, has brought about a demand for capacitors with high volumetric efficiency. These capacitors must also meet other criteria such as thinness and the capability to be mounted flat on conductors which have been accurately positioned for the purpose.

A number of different types of flat capacitors have been developed. One of these comprises paper with evaporated metal electrodes on opposite surfaces. However, this type of capacitor has a volumetric efficiency of only about 0.3—1.0 mfd./in.$^3$ which is much too low for most miniaturized hybrid circuits.

Another flat-type capacitor comprises a general purpose ceramic disc with screened metallized areas on opposite surfaces. This, too, has a relatively low volumetric efficiency, usually about 0.3—1.5 mfd./in.$^3$.

Somewhat better is a ceramic disc capacitor in which the ceramic is a reduced titanate or zirconate of an alkaline earth metal. This type capacitor has a volumetric efficiency of 20—30 mfd./in.$^3$. If a multilayer ceramic is used, this can be increased to 80—90 mfd./in.$^3$.

Much higher volumetric efficiencies of 9,000—10,000 mfd./in.$^3$ can be achieved with the tantalum, dry electrolytic capacitor. But this type of capacitor is relatively expensive and it is desirable to have even higher volumetric efficiencies so that the capacitor can be of minimum area.

An object of the present invention is to provide an improved, low cost flat capacitor with very high volumetric efficiency, suitable for mechanical handling and for placement on miniaturized hybrid circuits.

Embodiments of capacitors within the scope of the present invention will now be described with reference to the drawings.

DRAWINGS

FIG. 1 is a top plan view of a strip assembly of the anode leads which may be used to make a plurality of capacitors in accordance with the present invention;

FIG. 2 is a view similar to that of FIG. 1 showing the strip assembly at a later stage of the manufacturing process;

FIG. 3 is a cross section view taken along the line 3-3 of FIG. 2;

FIG. 4 is a top plan view illustrating a later step of affixing the strip leads to the body of the strip capacitors of the invention;

FIG. 5 is a view like that of FIG. 4 illustrating still later process steps;

FIGS. 6 and 7 are top plan views of a single capacitor cut from the strip of FIG. 5 and subjected to further processing steps;

FIG. 8 is a cross section view taken along the line 8-8 of FIG. 7 with particle sizes exaggerated; and FIG. 9 is a magnified view of a small part of the section shown in FIG. 8.

THE PREFERRED EMBODIMENT

A capacitor in accordance with the present invention includes a reduced ceramic having a microporous structure in order to get very large surface areas at the interfaces between the dielectric layer and the conducting layers. The ceramic may be one of the class consisting of alkaline earth metal titanates, zirconates, niobates and stannates, since they are readily reduced to a semiconducting state, but other substances, such as rare earth oxides, may be included in the compositions.

One of the problems that has arisen in making capacitors out of these porous reduced ceramic materials is that of connecting an electrode to the porous semiconducting structure. Embedding a wire or strip of metal is unsatisfactory because of cracking that occurs around the electrode when the unit is fired during the processing steps. The present invention includes an improved electrode and process of making it.

EXAMPLE I

In making a capacitor of the present invention, a plurality of units may be made simultaneously by fabricating a first green ceramic strip 2 having metal tabs 4 spaced at intervals on the strip and projecting over one edge. The green ceramic may be comprised of:

BaTiO$_3$    1000 grams
CeZrO$_4$    20 grams
Dibutyl phthalate    10 ml.
Butyl carbitol acetate    50 ml.
Solution made up of
  Toluol    8.3 parts by wt. and
  Butvar resin (polyvinyl butyral)
  1 part by wt.    250 ml.

This composition is milled for 20 hours and then cast as a film on a smooth surface by doctor blading to uniform desired thickness.

The metal tabs 4 are made by making up the following composition:

|  | Parts by weight |
|---|---|
| Powdered Palladium (or platinum or gold) | 80 |
| Butvar resin | 5 |
| Dibutyl phthalate | 1 |
| Butyl carbitol acetate | 3 |
| Toluol | 11 |
| Total | 100 | and casting a film on a smooth surface.

The strips 2 and tabs 4 may be cut from these films to desired size. In their unfired state, the tabs and strips adhere to each other with heat and pressure.

As shown in FIGS. 2 and 3, a second strip of green ceramic 6 is placed over the first ceramic strip 2 and the metal tabs 4 to form a composite assembly 8.

The composite strip 8 is then adhered along one edge of a green ceramic strip 10 (FIG. 4) which is made by casting a composition like that given for strips 2 and 6 except that the composition is loaded with wood flour. The composite strip 8 is permitted to project slightly over one edge 12 of the ceramic strip 10.

Then, as shown in FIG. 5, portions of the projecting edge of the composite strip 8 are cut away to leave protective sleeves 14 around tabs 4 but permitting the tabs 4 to project a greater distance from the main body.

The assembly is now subjected to a two-step firing operation. First, it is fired in air and then in a hydrogen reducing atmosphere at a temperature of 1200°—1400° C. During the air-firing step, the binders and solvents and wood particles are burned off leaving voids and forming a microporous structure in the strip 10. The binder and solvents of composite strip 8 are also burned away producing ceramic and metal particles sintered together in a dense structure. During the hydrogen firing step, the ceramic particles are reduced to the semiconducting state in both strips 8 and 10. The composite strip 10 must, at this point, be cut along the dotted lines 20 (FIG. 5) to form individual slugs 22 (FIG. 6).

Next, a dielectric layer is formed throughout the porous structure of each capacitor slug 22. This may be done in any one of several ways. One way is to dip the unit, up to but not beyond the sleeves 14, in a dilute solution of ammonia and subject the unit to an electrolytic anodizing treatment, with the semiconducting ceramic as anode, at 400 to 500 volts and a current of up to about 130 milliamps. This forms a dielectric oxide layer 16 over the surfaces of the reduced ceramic particles of strip 10 as shown in FIG. 9.

The dielectric layer 16 must be covered with a conducting layer to complete the capacitor. This may be done by dipping the unit in a colloidal suspension of graphite (Aquadag) so that a layer of carbon particles 18 forms throughout the porous part of the structure, as shown in FIG. 9, and also deposits on each individual slug 22 over the entire external surface, as shown in FIG. 6. The unit should be dipped into the suspension including strip 8 but not beyond the sleeve 14, since the tabs 4 must not be shorted to the coating 18. The suspension penetrates the porous structure by capillarity but does not soak into the dense structure of the strip 8. The assembly is then heat-treated in air at moderate temperatures to drive off the suspending liquid.

The entire outer surface, except for the sleeves 14 and tabs 4, of each unit capacitor 22 is then provided with a metallic coating 24 (FIG. 7) to facilitate soldering. The coating 24 may be a metal-loaded Epoxy resin or molten sprayed solder.

When the capacitor 22 is to be mounted in a hybrid integrated circuit it is placed on metallized connector pads which are terminal areas designed to receive both anode and cathode. The attachment can be either conventional solder or conductive Epoxy.

FIGS. 8 and 9 show more clearly how the tab 4 serves as one electrode connection of the capacitor. As particularly illustrated in FIG. 9, the ceramic particles of the composite strip 8 coalesce during the firing operation in the air atmosphere to form a dense layer. In this layer, any pores that remain are not interconnected. The hydrogen firing is able to penetrate the layer sufficiently to reduce the particles but the layer is not porous enough to allow liquids to penetrate during anodization.

Many electrically conducting paths thus exist from the metal tab 4 through the semiconducting particles of the strip 8.

In the strip 10, although the surfaces of the ceramic particles 25 are coated with a dielectric layer 16 due to the anodizing liquid being permitted to circulate through the mass because of the interconnected voids 26, electrically conducting paths from one particle to another still remain. This is because the particles 25 have coalesced prior to the anodization treatment. Thus, the tab 4 is electrically connected to one plate of the capacitor formed by the electrically conducting cores of particles 25.

The carbon particles 18 which constitute one plate of the capacitor are electrically connected to the metal layer 24.

The capacitor which is thus provided has an unusually high volumetric efficiency.

An important improvement brought about by the preferred embodiment of the present invention is in the structure of the metal tab 4 and the manner in which it is joined to the semiconducting portions of the ceramic body. First of all, the tab is preferably made of metal powder which shrinks during firing like the ceramic composition. This prevents cracking which usually occurs due to different rates of shrinking between a particulate body and a solid body. Also, the metal tab is surrounded with a dense ceramic rather than a porous structure like that of the main body 10 so that when the assembly is anodized and treated to introduce a conducting layer over the dielectric layer, the conducting substance cannot penetrate to the metal tab and cause a short.

Variations can be made in the processing steps. The metal tab 4 may be provided with a thick coating of the reducible ceramic composition instead of being laminated in a strip. And the coated tabs can be disposed within the strip 10 by inserting them between two laminations which may be used to make up the strip.

The metal layer 24 may be composed of solder or evaporated metal.

The dielectric layer 16 may be made by impregnating the porous body with an oxidizable substance such as silver nitrate or metalo-organic resinate, and heating in air.

We claim:

1. A capacitor comprising a porous, multicelled body composed of a reduced dielectric ceramic semiconductor, a dielectric layer distributed throughout the cellular structure composed of an oxidized portion of said body, one electrode comprising an electrically conducting layer over at least a portion of the exterior surface of said oxidized layer and another electrode comprising a strip of sintered powder of a noble metal having a portion coated with a dense, reduced ceramic material, said portion being fused with the ceramic semiconductor and forming a conductive path between said strip and said semiconductor.

2. A capacitor according to claim 1 in which said ceramic is composed mainly of one or more alkaline earth metal titanates, zirconates, niobates and stannates.

3. A capacitor according to claim 1 in which said one electrode comprises finely divided carbon.

4. A capacitor according to claim 1 in which said one electrode comprises metal.

5. A method of making a ceramic capacitor comprising:
   a. forming a first "green" ceramic body composed of a high dielectric reducible material mixed with a volatilizable particulate substance,
   b. forming a second green ceramic body composed of a strip of said high dielectric reducible material in which is partially embedded a plurality of metal tabs each of which comprises noble metal particles and a volatilizable binder,
   c. laminating said second body and said first body to form an assembly,
   d. firing the assembly in an oxidizing atmosphere to burn off said volatilizable substances and produce a microporous structure in said first body and to sinter said metal particles,
   e. firing the assembly in a reducing atmosphere to reduce said high dielectric reducible material to a semiconducting state,
   f. oxidizing a surface layer throughout said microporous structure to form a dielectric layer, and
   g. depositing a layer of an electrically conducting substance on said dielectric layer.